(12) United States Patent
Qu et al.

(10) Patent No.: US 10,587,707 B2
(45) Date of Patent: Mar. 10, 2020

(54) METHOD AND APPARATUS FOR MONITORING WEBSITE ACCESS DATA

(71) Applicant: Tencent Technology (Shenzhen) Company Limited, Shenzhen (CN)

(72) Inventors: Baochuang Qu, Shenzhen (CN); Bo Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 195 days.

(21) Appl. No.: 14/818,718

(22) Filed: Aug. 5, 2015

(65) Prior Publication Data

US 2015/0341455 A1 Nov. 26, 2015

Related U.S. Application Data

(63) Continuation of application No. PCT/CN2014/084489, filed on Aug. 15, 2014.

(30) Foreign Application Priority Data

Aug. 28, 2013 (CN) .......................... 2013 1 0380434

(51) Int. Cl.
*H04L 29/08* (2006.01)
*H04L 29/06* (2006.01)
(Continued)

(52) U.S. Cl.
CPC ............. *H04L 67/22* (2013.01); *G06Q 30/02* (2013.01); *H04L 43/04* (2013.01); *H04L 67/025* (2013.01); *H04L 67/42* (2013.01); *Y04S 40/168* (2013.01)

(58) Field of Classification Search
CPC ............. G06F 21/316; G06F 17/30058; G06F 11/3438; G06F 11/3476; G06F 2201/875;
(Continued)

(56) References Cited

U.S. PATENT DOCUMENTS 6,052,730 A * 4/2000 Felciano ............. G06F 11/3476
709/203
6,704,732 B1 * 3/2004 Barclay ............... G06F 11/3495
(Continued)

FOREIGN PATENT DOCUMENTS

CN 101192227 A 6/2008
CN 103178982 A 6/2013

OTHER PUBLICATIONS

Tencent Technology, ISRWO, PCT/CN2014/084489, Nov. 21, 2014, 8 pgs.
(Continued)

*Primary Examiner* — Jason D Recek
*Assistant Examiner* — Ranjan Pant
(74) *Attorney, Agent, or Firm* — Morgan, Lewis & Bockius LLP

(57) ABSTRACT

A method for monitoring and analyzing website visit data includes acquiring real-time source data of sessions established between a client terminal and a server; classifying the real-time source data of sessions into a plurality of categories based on the website and a session identifier; caching the categories of the real-time source data of sessions in the memory; if a categorized session is valid, calculating visit effect data of the session using the source data; consolidating the visit effect data of the session with a sum of visit effect data; and updating the sum of visit effect data; if a categorized session is invalid, calculating failure effect data of the session; consolidating the failure effect data of the session with the sum of visit effect data; and deleting the source data of the session from the memory.

16 Claims, 5 Drawing Sheets

(51) Int. Cl.
*H04L 12/26* (2006.01)
*G06Q 30/02* (2012.01)

(58) Field of Classification Search
CPC ......... G06F 2221/2151; G06F 17/3089; G06F 17/30867; G06F 17/3053; G06F 3/0481; G06F 17/30; G06F 17/30663; G06F 17/30719; G06F 7/08; G06Q 20/4014; G06Q 30/02; G06Q 30/0241; G06Q 30/0201; G06Q 30/0251; G06Q 10/063114; G06Q 50/01; G06Q 30/0204; H04L 63/168; H04L 67/02; H04L 63/1425; H04L 67/306; H04L 67/22; H04L 65/1083; H04L 69/329; H04L 67/2852; H04L 67/42; H04L 43/04; H04L 67/10; H04M 15/58
See application file for complete search history.

(56) References Cited

U.S. PATENT DOCUMENTS

| | | | | |
|---|---|---|---|---|
| 6,912,505 | B2* | 6/2005 | Linden | G06Q 30/02 705/14.53 |
| 7,533,179 | B2* | 5/2009 | Tarquini | G06Q 30/02 709/217 |
| 7,636,305 | B1* | 12/2009 | Taylor | H04L 63/1458 370/230 |
| 7,822,755 | B2* | 10/2010 | Barua | G06F 17/3089 707/755 |
| 8,352,318 | B2* | 1/2013 | Rikhtverchik | G06Q 30/00 702/186 |
| 9,459,766 | B1* | 10/2016 | Haynes | G06Q 30/0201 |
| 9,646,322 | B2* | 5/2017 | Minnis | G06F 17/30867 |
| 9,934,265 | B2* | 4/2018 | Karandikar | G06F 17/30368 |
| 2002/0087679 | A1* | 7/2002 | Pulley | G06Q 30/02 709/224 |
| 2002/0099843 | A1* | 7/2002 | Fruchtman | H04L 29/06 709/232 |
| 2002/0128925 | A1* | 9/2002 | Angeles | G06F 11/3414 705/26.1 |
| 2003/0130982 | A1* | 7/2003 | Kasriel | G06F 17/3089 |
| 2006/0036400 | A1* | 2/2006 | Kasriel | G06F 17/3089 702/182 |
| 2006/0072455 | A1* | 4/2006 | Cai | H04L 63/1416 370/230 |
| 2008/0086558 | A1* | 4/2008 | Bahadori | G06F 11/3438 709/224 |
| 2008/0222284 | A1* | 9/2008 | Barua | G06F 17/3089 709/224 |
| 2008/0307044 | A1* | 12/2008 | Musson | G06F 17/30876 709/203 |
| 2009/0265461 | A1* | 10/2009 | Tarquini | G06Q 30/02 709/224 |
| 2010/0088354 | A1* | 4/2010 | Wu | G06F 11/3409 707/827 |
| 2010/0281178 | A1* | 11/2010 | Sullivan | H04N 7/24 709/231 |
| 2010/0306315 | A1* | 12/2010 | Smith | G06F 11/3438 709/203 |
| 2012/0036259 | A1* | 2/2012 | Minnis | G06F 17/30867 709/224 |
| 2013/0196689 | A1* | 8/2013 | Smith | H04W 4/21 455/456.3 |
| 2013/0246904 | A1* | 9/2013 | Seliger | G06F 3/0481 715/234 |
| 2014/0214483 | A1* | 7/2014 | Minnis | G06F 17/30867 705/7.29 |
| 2014/0258274 | A1* | 9/2014 | Walters | G06F 17/3053 707/722 |
| 2014/0379428 | A1* | 12/2014 | Phansalkar | G06Q 30/0202 705/7.32 |
| 2015/0081389 | A1* | 3/2015 | Dereszynski | G06Q 30/0204 705/7.33 |

OTHER PUBLICATIONS

Tencent Technology, IPRP, PCT/CN2014/084489, Mar. 1, 2016, 6 pgs.

* cited by examiner

METHOD AND APPARATUS FOR MONITORING WEBSITE ACCESS DATA

RELATED APPLICATIONS

This application is a continuation application of PCT Patent Application No. PCT/CN2014/084489, entitled "METHOD AND APPARATUS FOR MONITORING WEBSITE ACCESS DATA" filed on Aug. 15, 2014, which claims priority to Chinese Patent Application No. 201310380434.4, entitled "Method and Apparatus for Monitoring Website Access Data" filed on Aug. 28, 2013, both of which are incorporated by reference in their entirety.

TECHNICAL FIELD

The disclosed implementations relate to the field of Internet data processing technology, and in particular, to a method and an apparatus for monitoring and analyzing website visit data.

BACKGROUND

Technologies to monitor websites visit data are adopted to analyze and further, optimize the internet performance. Such technologies include data monitoring, data collection, data analysis, and data reporting, etc. The operation efficiency and visit traffic of a website can be improved using the tracked and analyzed data, and the functional goals that a website developer expects can be achieved.

The current technology collects statistic data of a website that includes numbers of page views (PV) and numbers of unique visitors (UV).

PV is a major criterion to measure a website, a news link of a website, and traffic of a website. Monitoring the varying trend of the website PV and analyzing the reasons for the varying trend is regular work for many website administrators. The word "page" in the term "page views" generally refers to an ordinary html page, but may also refer to html contents dynamically-generated by php, jsp, etc. An html content request from a browser may be considered to be a PV, which is accumulated into a sum of PV.

UV refers to human beings that access and browse a webpage via internet. For example, user A opens the homepage of a certain website, and registers as a member on a computer. A moment later, user B registers as another member using the same computer. As user A and user B use the same computer with the same IP address. An official counter of the website records login information from a single IP address. However, a further monitoring system may determine the number of actual users according to other conditions. Further, a website developer can get accurate and complete information of the users of the website. For instance, using the information of registered users, different computers sharing an IP address in an internet café or a computer room can be distinguished.

The current technologies utilize a big data platform to monitor and analyze websites. Visit data of websites are collected on a daily basis, and daily visit effect data including PVs and UVs are calculated. However, the big data platform requires centralized computation of the daily collected data, and thus, requires high performance computers. Further, processing a large amount of data daily is inefficient. In view of the foregoing, it is difficult for the current technologies to provide real-time monitoring and analysis of the website visit data from various perspective views, for instance, real-time PVs and UVs calculated based on visit traffic and visit source, etc.

SUMMARY

In accordance with some implementations of the present application, a method for monitoring and analyzing website visit data comprises: at a computer device having one or more processors and memory storing programs for execution by the one or more processors, acquiring real-time source data of sessions established between a client terminal and a server; classifying the real-time source data into a plurality of categories based on the website and a session identifier; caching the categorized real-time source data in the memory; if a session corresponding to the categorized real-time source data is valid, calculating visit effect data of the session using the source data; consolidating the visit effect data of the session with a sum of visit effect data; and updating the sum of visit effect data; if a session corresponding to the categorized real-time source data is invalid, calculating failure effect data of the session; consolidating the failure effect data of the session with the sum of visit effect data; and deleting the source data of the session from the memory.

In some embodiments, the method for monitoring and analyzing website visit data further comprises sorting the real-time source data of sessions in accordance with an occurrence time of the session.

In some embodiments, the method for monitoring and analyzing website visit data further comprises acquiring a user identifier for each session; acquiring user portrait data that corresponds to the user identifier; and supplementing the user portrait data into the source data of the session.

In some embodiments, the method for monitoring and analyzing website visit data further comprises coding a uniform resource locator (URL) in the source data of the session in accordance with a pre-determined compression coding format; and replacing the URL in the source data of the session with the coded URL.

In some embodiments, the method for monitoring and analyzing website visit data further comprises determining whether the source data of the session includes a webpage visiting record; and if the source data of the session does not include a webpage visiting record, further determining a frequency of a pre-defined operation, and if the frequency of the pre-defined operation exceeds a pre-set threshold, deleting data that associates with the pre-defined operation from the source data of the session.

In some embodiments, the visit effect data of the session includes at least one of four dimensional data: traffic analysis data, source analysis data, visitor analysis data, and visitor behavior analysis data.

In some embodiments, each dimensional data includes at least page views data and unique visitors data.

In some embodiments, the method for monitoring and analyzing website visit data further comprises calculating a unique visitors number for each dimensional data, wherein if an update speed is higher than a pre-defined speed, the unique visitors number is calculated using a set structure, and the user identifier of the session with respect to the dimensional data is stored in a designated memory module; and if the update speed is lower than the pre-defined speed, the unique visitors number is calculated through determining whether a uvset structure of a current day includes a user identifier.

In accordance with some implementations of the present application, a system for monitoring and analyzing website visit data comprises: one or more processors; memory; and one or more programs stored in the memory and configured for execution by the one or more processors, the one or more programs including instructions for: acquiring real-time source data of sessions established between a client terminal and a server; classifying the real-time source data into a plurality of categories based on the website and a session identifier; caching the categorized real-time source data in the memory; if a session corresponding to the categorized real-time source data is valid, calculating visit effect data of the session using the source data; consolidating the visit effect data of the session with a sum of visit effect data; and updating the sum of visit effect data; if a session corresponding to the categorized real-time source data is invalid, calculating failure effect data of the session; consolidating the failure effect data of the session with the sum of visit effect data; and deleting the source data of the session from the memory.

In accordance with some implementations of the present application, a non-transitory computer readable storage medium, storing one or more programs for execution by one or more processors of a service processing system including instructions for: acquiring real-time source data of sessions established between a client terminal and a server; classifying the real-time source data into a plurality of categories based on the website and a session identifier; caching the categorized real-time source data of sessions in the memory; if a session corresponding to the categorized real-time source data is valid, calculating visit effect data of the session using the source data; consolidating the visit effect data of the session with a sum of visit effect data; and updating the sum of visit effect data; if a session corresponding to the categorized real-time source data is invalid, calculating failure effect data of the session; consolidating the failure effect data of the session with the sum of visit effect data; and deleting the source data of the session from the memory.

BRIEF DESCRIPTION OF DRAWINGS

The aforementioned implementation of the present application as well as additional implementations will be more clearly understood as a result of the following detailed description of the various aspects of the present application when taken in conjunction with the drawings. Like reference numerals refer to corresponding parts throughout the several views of the drawings.

DETAILED DESCRIPTION

The present application will be described in further detail below with reference to drawings and specific embodiments.

Figure 1:
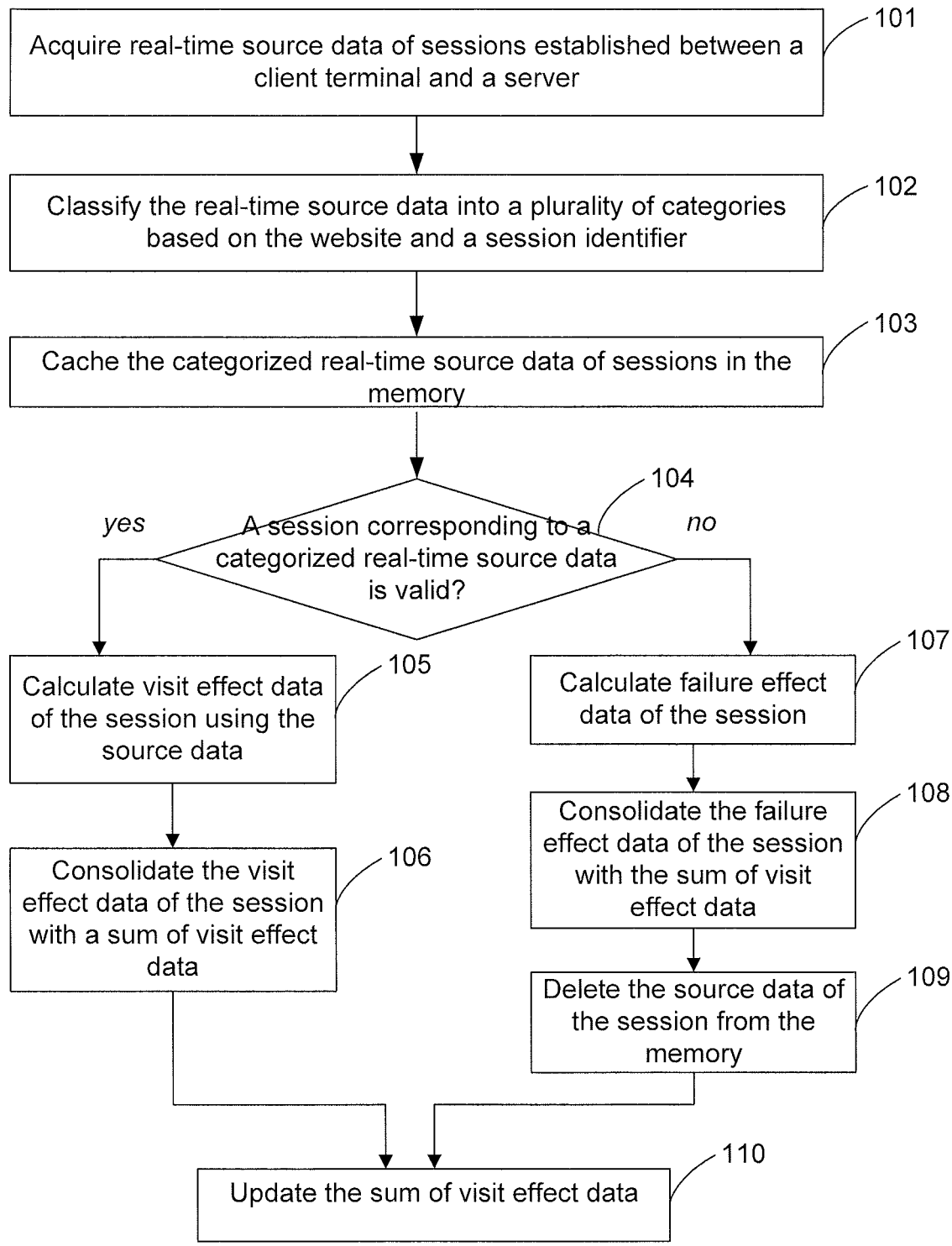
FIG. 1 is a flow chart of a method for monitoring website access data of the present application.

FIG. 1 is a flow chart of a method for monitoring the website access data of the present application.

At step 101, real-time source data of sessions established between a client terminal and a server is acquired.

Source data of a session is raw data that records a user conversation, which is a series of request-response established between a client terminal and a server. The server may recognize a client terminal from the received request. When the server receives a first request from an unknown client terminal, a conversation is established. Further, when the server receives an instruction to terminate the conversation, or the server does not receive any requests from the client terminal for a pre-set time period, the conversation is deemed terminated.

The first request sent by the client to the server of the website may not be the first interaction between the client and the server. The first request refers to a request for establishing a session. It is generally referred to as a "first" request because it is the beginning of counting the number of requests (logically), and also the beginning that the server recognizes the client. For example, when the user logs in or adds a merchandize to a shopping cart, a session is initiated and established.

The source data of a session may be divided into source access data and source behavior data, which are obtained from an access data source and a behavior data source, respectively. The source session data may include website information and session identification information. The source access data may include, a user identification (ID), an IP address, cookie information, starting and ending time of a session, uniform resource locators (URLs) for accessing the page, and data carried in commonly-used Internet protocols such as hypertext transfer protocol (HTTP).

The source behavior data may also include a user ID, an IP address, cookie information, starting and ending time of a session, URLs for accessing the page and the like. The source behavior data may further include the sequence information that records the user's action and behavior on the webpage, for example, user logging in, registering, voting, sending message in Weibo, etc.

The data source from which session data can be retrieved is usually the server of a website. The server of the website may monitor the conversations between users and the website, and generate corresponding session data. As the session data is generated and updated in real time, the present application can acquire the real-time source data of sessions that includes newly-generated session data, and updated session data.

At step 102, the real-time source data is classified into a plurality of categories based on the website and a session identifier.

In some embodiments, to achieve a higher read-write speed and improve real-time performance, the storage device refers to a local memory of a computer. The memory is used as an illustrative example of the storage device in the embodiments discussed below; however, the storage device may also refer to an external memory device.

Step 102 is a process of data construction. The data is stored in a structure with a basic unit of storage being a session, i.e., each unit of the stored data indicates a single session. According to the present embodiment, the source session data is classified into a plurality of categories based on the website and a session identifier, and further cached in the memory.

If n websites are monitored and each website generates m sessions, then n*m basic data units can be constructed, and each data unit stores the data of one corresponding session. The amount of source data associated with a monitored website is typically huge. With the data construction of the present application, the huge amount of data source is sliced into pieces of information at a session level, which can facilitate real-time computation and updating.

At step 103, the categorized real-time source data of sessions are cached in the memory.

At step 104, the method determines whether a session corresponding to the categorized real-time source data is valid.

If a session corresponding to the categorized real-time source data is valid, at step 105, visit effect data of the session is calculated using the source data; and further at step 106, the visit effect data of the session is consolidated with a sum of visit effect data.

If a session corresponding to the categorized real-time source data is invalid, failure effect data of the session is calculated at step 107; the failure effect data of the session is consolidated with the sum of visit effect data at step 108; and the source data of the session is deleted from the memory at step 109.

At step 110, the sum of visit effect data is updated.

According to the present embodiment, newly acquired session data is stored in the memory as classified, and an updating computation of the visit effect data is triggered based on the newly acquired session data. Each updating computation is substantially an increment calculation, and generates incremental visit effect data.

As the visit effect data is computed and updated based on each session data according to the present application, the computation efficiency is improved. The present application may further analyze the visit effect data in accordance with difference aspects of the received session data.

In some embodiments, the aspects of the visit effect data may include at least one of four dimensional data types: traffic analysis data, source analysis data, visitor analysis data, and visitor behavior analysis data.

In some embodiments, each aspect of the visit effect data may include at least page views (PV) data and unique visitors (UV) data. For instance, traffic analysis data may include a total PV number and UV number of a website and/or a webpage associated with the website.

The source analysis data may include information of the client terminal from which a request is sent, such as operation system, browser type, desktop, or mobile terminal, etc., and the PV number and UV number that associate with the above-noted information.

The visitor analysis data may include type of visitors that access a website and/or a webpage, such as, sex, age, location, hobbies of the visit, and the PV number and UV number that associate with the above-noted types. For example, the visitor analysis data may include the PV number and UV number associated with a male visitor who visits the website A, and the PV number and UV number associated with a visitor located in Beijing who visits the website A.

The visitor behavior analysis data may include types of user behaviors when a user visits a website and/or a webpage of the website, for example, for Weibo website, whether the user participates in the discussion and voting, watches a video, clicks a web advertisement, and the PV number and UV number that associate with the above-noted types. For example, the visitor behavior analysis data may include the PV number and UV number associated with a click of a web advertisement posted on the webpage C of the website B.

The computation methods of the PV number and UV number adopt existing technologies, and therefore, are not discussed herein.

In some embodiments, a session ending time is compared with a last updating time of the visit effect data. If the last updating time is later than the session ending time, the session is determined as invalid, and a failure effect data is calculated.

In some embodiments, calculating failure effect data further includes: calculating a total time length of the session, extracting webpage visits information, generating webpage visiting path and association information, and calculating an exit rate of the session. In some embodiments, the exit rate of the session is defined as a ratio of exiting frequencies from a website after visiting only one webpage versus total visits of the website.

In some embodiments, session data is deleted from the memory after the failure effect data is calculated. Accordingly, memory is refreshed and the system resources can be effectively used in computation and analysis.

According to the present application, the source data of sessions is classified based on a session unit instead of a day unit. As the session duration is in general much shorter than a day, and the session data may include complete conversation between a client and the server, the present application can utilize the system resources more efficiently and can further provide website analysis based on more aspects of the session data.

According to the present application, the real-time performance of updating the visit data can be greatly improved, and the updating accuracy can achieve at the minute level. Further, the present application does not depend on large data platforms and encompasses multi-dimensional real-time effect computations, for example, traffic analysis, source analysis, visitor analysis, and behavior analysis, etc. Because the present application adopts incremental update computation, the computation amount for each updating is relatively small, and the resource is released immediately after the computation, thereby improving the system resource utilization. In addition, the requirement on system computation ability is much less than the traditional big platforms. Accordingly, although the computation dimensionalities increase, real-time performance of multi-dimensional computation can be improved with high efficiency.

In some embodiments, the real-time source data of sessions is sorted in accordance with session occurring time. For example, source session data a, source session data b and source session data c are acquired in sequence. Based on the session time recorded in the source session data, source session data c occurs first followed by source session data b and source session data a. After sorting based on the session time, the sequence reads as source session data c, source session data b and source session data a.

In some embodiments, after acquiring source session data of the website in real time and before classifying and caching the source session data to the memory based on the site and session identification, i.e., when conducting data construction, the present application may further comprise acquiring the user identification (such as the user ID, or the user's IP address) of the source session data, acquiring the user portrait data that corresponds to the user identification, and supplementing the user portrait data to the source session data.

The user portrait data may indicate different attributes of the user, for example, sex, location, hobbies, etc. A user portrait data source refers to a specialized database that stores the user's portrait data through statistical analysis based on the historical data. According to the present application, the user portrait data is supplemented to the source session data, which is then used to calculate visit effect data.

According to the present application, the calculated visit effect data can be more accurate and comprehensive.

In another embodiment, after acquiring source session data of the website in real time and before classifying and caching the source session data to the memory based on the site and session identification, i.e., when conducting data construction, the present application may further comprise encoding URLs in the source session data according to a specified compression encoding format and replacing corresponding URLs in the source session data with encoded URLs. The reason for the above-noted steps is that the URL has a large number of characters which occupy more storage resource, and the number of characters of the encoded URL is relatively small, thereby saving the storage resource. In particular, as the session data is cached to the memory with limited storage, the encoding of the URL may greatly save the memory resource and improve the process efficiency.

In yet another embodiment, after acquiring source session data of the website in real time and before classifying and caching the source session data to the memory based on the site and session identification, i.e., when conducting data construction, the present application may further comprise determining whether the source data of the session includes a webpage visiting record; and if the source data of the session does not include a webpage visiting record, further determining a frequency of a pre-defined operation, if the frequency of the pre-defined operation exceeds a pre-set threshold, deleting data that associates with the pre-defined operation from the source data of the session.

In some embodiments, the method further comprises calculating a UV number for each dimensional data. If an update speed is higher than a pre-defined speed (i.e., data for traffic analysis, visitor analysis, and visitor behavior analysis is updated in minutes), the UV number is calculated using a set structure, and the user identifier of the session with respect to the dimensional data is stored in a designated memory module. If the update speed is lower than the pre-defined speed (i.e., source analysis data is normally updated in a day or a week), the UV number is calculated through determining whether a uvset structure of a current day includes a user identifier.

In some embodiments, the visit effect data may be exported to an internal memory in real-time, and exported to an external memory in a period of time, including association and path information to update the data structure. The visit effect data exported to the external memory may be further used to generate data report forms. The updating frequency of the external memory may be adjusted based on the performance of the memory.

Figure 2:
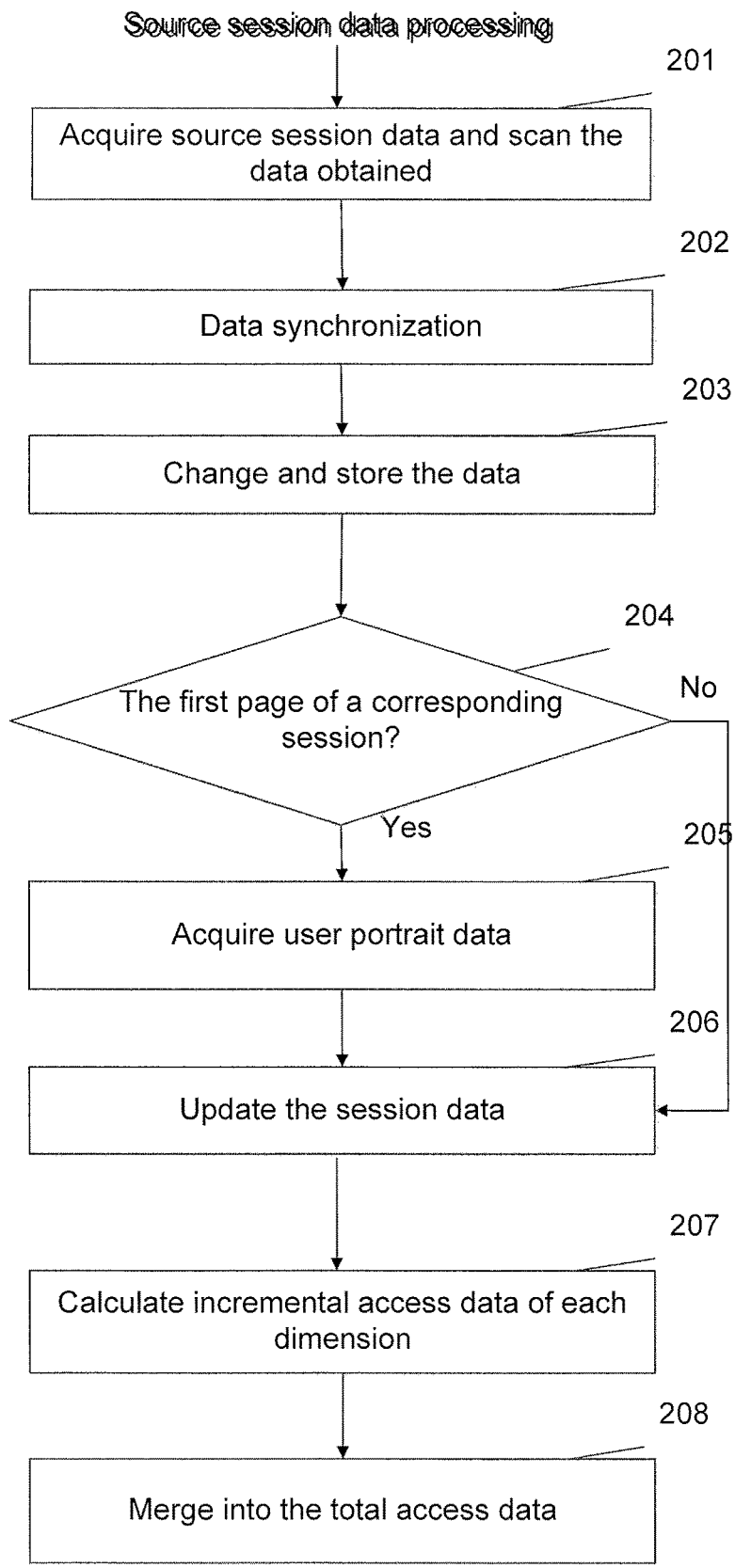
FIG. 2 is a first subflow chart of a specific embodiment of a method for monitoring website access data.
Figure 3:
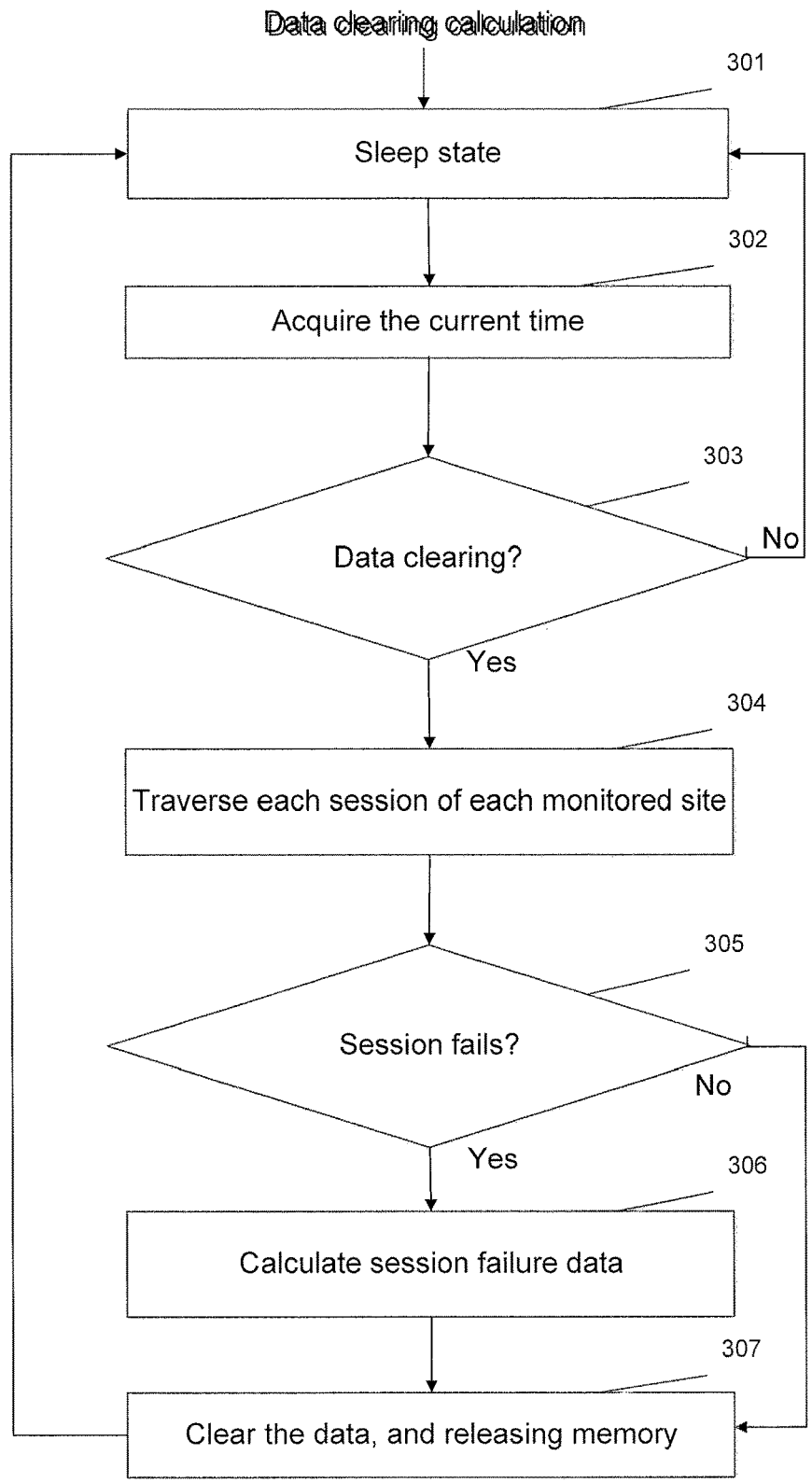
FIG. 3 is a second subflow chart of a specific embodiment of a method for monitoring website access data.
Figure 4:
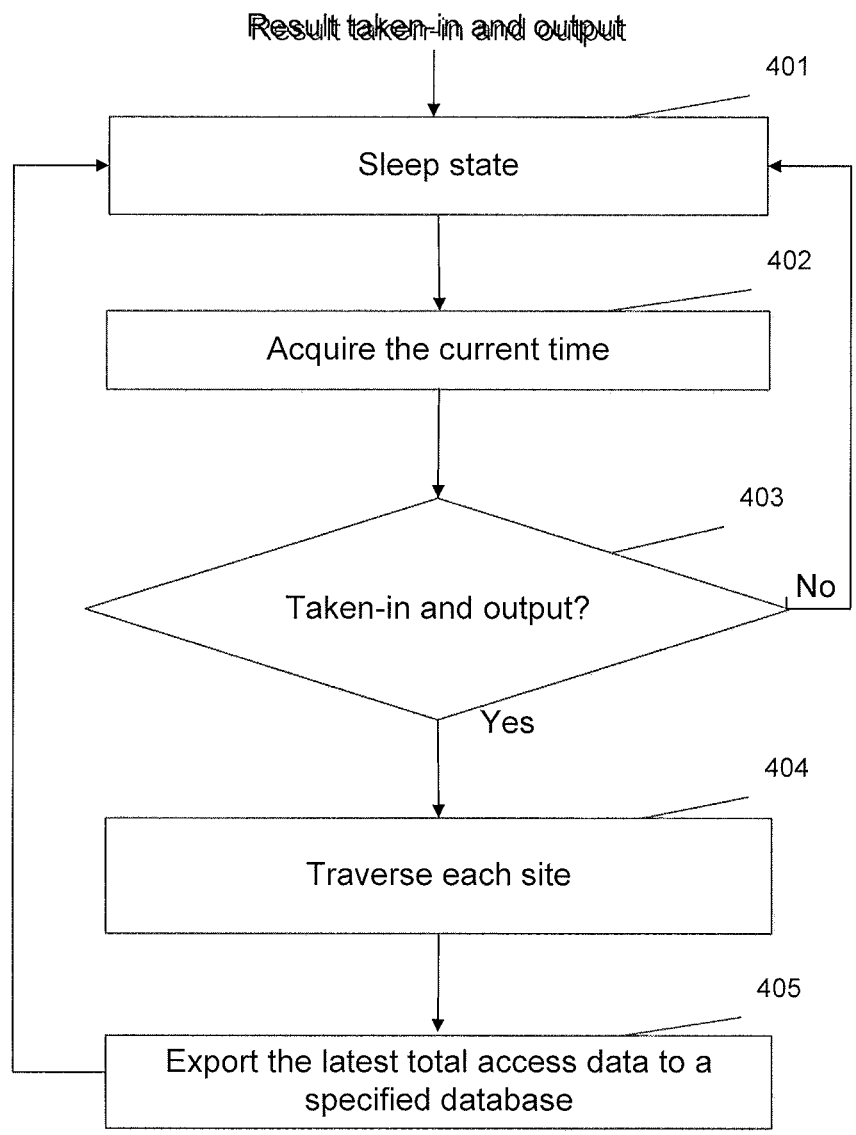
FIG. 4 is a third subflow chart of a specific embodiment of a method for monitoring website access data.

FIG. 2 is a first subflow chart of a specific embodiment of a method for monitoring the website access data. FIG. 3 is a second subflow chart of a specific embodiment of a method for monitoring website access data. FIG. 4 is a third subflow chart of a specific embodiment of a method for monitoring website access data. In some embodiments, the three subflows may be performed in parallel.

The first subflow illustrated in FIG. 2 is a processing flow of the source session data comprises the steps discussed below.

At step 201, source session data is acquired and scanned.

At step 202, whether the acquired source session data needs to be synchronized is determined according to the session time in the source session data; and if the acquired source session data needs to be synchronized, synchronization will be conducted on the data, i.e., time synchronization adjustment is conducted on the acquired source session data.

At step 203, the source session data is adjusted and stored. This may include encoding the URLs in the source session data according to a specified compression encoding format, replacing the URLs in the source session data with encoded URLs, and classifying and caching the source session data to the memory according to the site and session identification in accordance with the time sequence.

At step 204, a determination is made as to whether the currently scanned session data is the first page of a corresponding session.

At step 205, corresponding user portrait data according to the user identification is acquired, and the user portrait data is added to the source session data.

In general, a session corresponds to user portrait data. In this embodiment, the user portrait data is acquired at the first page of the session, and no user portrait data needs to be acquired at subsequent pages of the session.

At step 206, the session data is updated using the obtained user portrait data of the session.

At step 207, incremental access data of each dimension is calculated, for example, the traffic analysis data, the source analysis data, the visitor analysis data, and the visitor behavior analysis data.

At step 208, the calculated incremental access data at step 207 is merged into the previous total access data to obtain the latest total access data.

The second subflow illustrated in FIG. 3 comprises the steps discussed below.

At step 301, the system is in a sleep state after regularly clearing calculation results from the memory.

At step 302, a current time is acquired.

At step 303, a determination is made as to whether the current time reaches a preset time of data clearing calculation. If so, at step 304, each session of each site being monitored is traversed. If not, the system returns to the sleep state.

At step 305, a determination is made as to whether the current session fails. If not, the system jumps to step 307. If so, at step 306, session failure data is calculated and merged into the latest total access data. At step 307, the session data of the failed session is cleared from the memory, and the memory resources are released.

The third subflow illustrated in FIG. 4 comprises the steps discussed below.

At step 401, the system is in a sleep state after regularly updating results taken-in and output. At step 402, the current time is acquired. At step 403, a determination is made as to whether the current time reaches a preset time of taken-in and output.

If so, at step 404, each site being monitored is traversed. If not, then the system returns to the sleep state.

At step 405, the latest total access data of the site is exported to a specified database.

Figure 5:
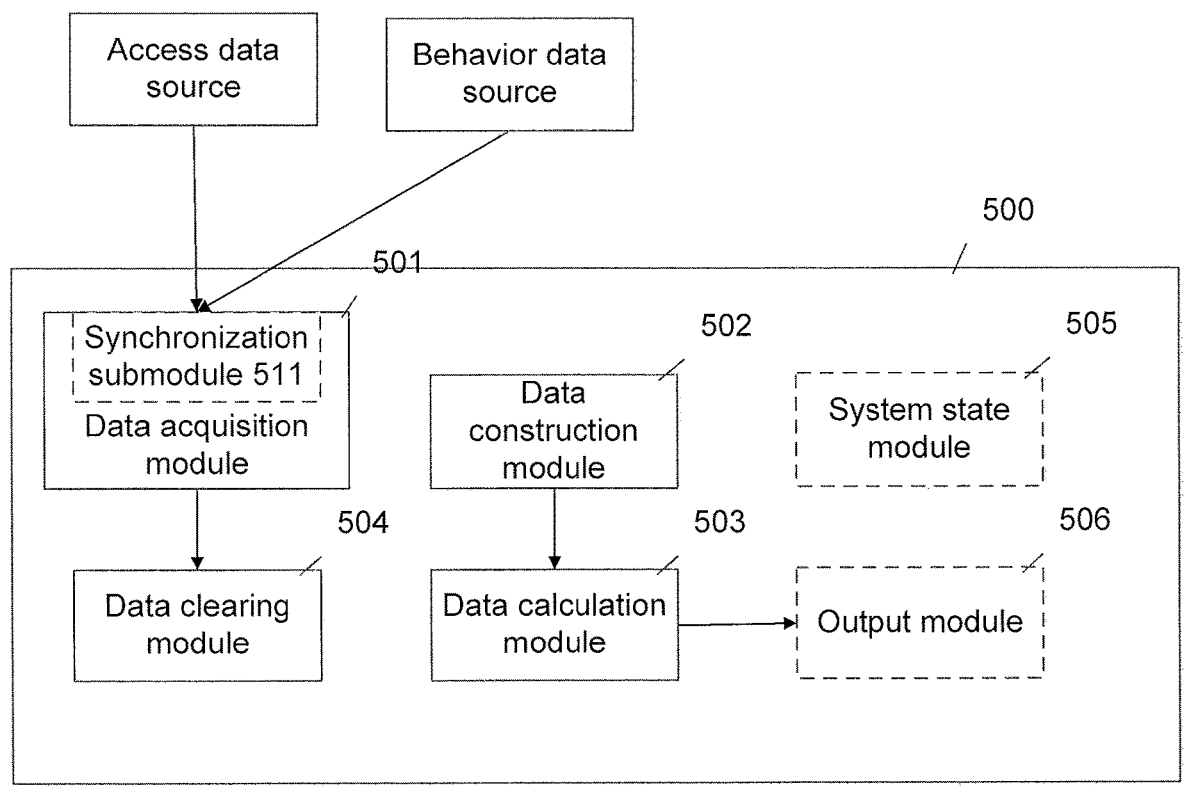
FIG. 5 is a structure block diagram of an apparatus for monitoring website access data of the present application.

FIG. 5 is a structure block diagram of an apparatus for monitoring website visit data. The apparatus includes a data acquisition module 501 for acquiring the source session data of the website in real time. A data construction module 502 classifies and caches the source session data to the memory based on the site and session identification. A data calculation module 503 computes new visit effect data using the acquired session data, and consolidates the new visit effect data into a sum of visit effect data to update the sum of the visit effect data. A data clearing module 504 determines whether the classified and cached session is valid. If the session is invalid, the data clearing module 504 calculates the failure effect data, consolidates the failure effect data into the sum of visit effect data, and clears the session data of the failed session from the memory. A system state module 505 collects the system operation parameters and an output module 506 exports the visit effect data to an external memory.

In some embodiments, the data acquisition module 501 may further comprise a synchronization submodule 511 for conducting time synchronization adjustment to all source session data based on the session time. Further, the data construction module 502 may be used for classifying and caching the source session data to the memory based on the website and session identifiers after the time synchronization adjustment.

In another embodiment, the data construction module 502 may be used for acquiring a user identifier in source session data before classifying and caching the source session data to the memory, acquiring user portrait data that associates with the user identifier, and supplementing the user portrait data to the source session data.

In yet another embodiment, the data construction module 502 may be used for encoding uniform resource locators (URLs) in the source session data according to a specified compression encoding format, and replacing the URLs in the source session data with the encoded URLs.

In yet another embodiment, the data construction module 502 may be used for determining whether the source data of the session includes a webpage visiting record. If the source data of the session does not include a webpage visiting record, the data construction module 502 further determines a frequency of a pre-defined operation and, if the frequency of the pre-defined operation exceeds a pre-set threshold, delete data that associates with the pre-defined operation from the source data of the session.

In some embodiments, the data calculation module 503 may be used to calculate a UV number for each dimensional data. If an update speed is higher than a pre-defined speed, the UV number is calculated using a set structure. In addition, the user identifier of the session with respect to the dimensional data is stored in a designated memory module. If the update speed is lower than the pre-defined speed, the UV number is calculated through determining whether a uvset structure of a current day includes a user identifier.

In some embodiments, the system state module 506 may further maintain the system operation parameters and output a visible view of the internal system. The system state may include the number of sessions in use, the number of sessions established in a past time period, the number of sessions being release, system clocks taken for processing the requests, and the number of requests being processed, etc.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the present application to the precise forms disclosed. Many modifications and variations are possible in view of the above teachings. The implementations were chosen and described in order to best explain principles of the present application and its practical applications, to thereby enable others skilled in the art to best utilize the present application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for monitoring and analyzing website visit data comprising:

at a computer device having one or more processors and memory storing programs for execution by the one or more processors,
  acquiring real-time source data of sessions established between a client terminal and a server, comprising:
    scanning the acquired real-time source data of a respective session;
    determining whether the scanned source data is a first page of the respective session;
    in accordance with a determination that the scanned source data is the first page of the respective session, acquiring user portrait data corresponding to a user identifier associated with the real-time source data of the respective session; and
    updating the real-time source data of the respective session using the user portrait data;
  classifying the real-time source data into a plurality of categories based on the website and a session identifier;
  caching the categorized real-time source data of a session corresponding to the session identifier in the memory, the session having a session ending time; and
  performing the following operations in real-time:
    comparing the session ending time with a last updating time of a sum of visit effect data associated with the website;
    if the session ending time is later than the last updating time,
      calculating visit effect data of the session using the categorized real-time source data of the session, further including generating traffic analysis data, source analysis data, visitor analysis data, and visitor behavior analysis data associated with the website;
      consolidating the visit effect data of the session with the sum of visit effect data associated with the website;
      keeping the categorized real-time source data of the session in the memory to be combined with subsequent real-time source data of the session before the session is completed; and
    if the session ending time is no later than the last updating time,
      calculating completed visit effect data of the session using a completed source data of the session stored in the memory, further including generating a total length of the session, webpage visits information, webpage visiting path and association information, and an exit rate of the session associated with the website;
      consolidating the completed visit effect data of the session with the sum of visit effect data associated with the website; and
      deleting the completed source data of the session from the memory to refresh the memory;
    updating the sum of visit effect data associated with the website.

2. The method for monitoring and analyzing website visit data of claim 1, further comprising:
  sorting the real-time source data in accordance with an occurrence time of the session.

3. The method for monitoring and analyzing website visit data of claim 1, further comprising:
  acquiring the user identifier for each session; and
  supplementing the user portrait data into the source data of the session.

4. The method for monitoring and analyzing website visit data of claim 1, further comprising:
  coding a uniform resource locator (URL) in the source data of the session in accordance with a pre-determined compression coding format; and
  replacing the URL in the source data of the session with the coded URL.

5. The method for monitoring and analyzing website visit data of claim 1, wherein each dimensional data includes at least page views data and unique visitors data.

6. The method for monitoring and analyzing website visit data of claim 5, further comprising calculating a unique visitors number for each dimensional data, wherein
  if an update speed is higher than a pre-defined speed, the unique visitors number is calculated using a set structure, and the user identifier of the session with respect to the dimensional data is stored in a designated memory module; and
  if the update speed is lower than the pre-defined speed, the unique visitors number is calculated through determining whether a set structure of unique visitors of a current day includes a user identifier.

7. A system for monitoring and analyzing website visit data comprising:
  one or more processors;
  memory; and
  one or more programs stored in the memory and configured for execution by the one or more processors, the one or more programs including instructions for:
    acquiring real-time source data of sessions established between a client terminal and a server, comprising:
      scanning the acquired real-time source data of a respective session;
      determining whether the scanned source data is a first page of the respective session;
      in accordance with a determination that the scanned source data is the first page of the respective session, acquiring user portrait data corresponding to a user identifier associated with the real-time source data of the respective session; and
      updating the real-time source data of the respective session using the user portrait data;
    classifying the real-time source data into a plurality of categories based on the website and a session identifier;
    caching the categorized real-time source data of a session corresponding to the session identifier in the memory, the session having a session ending time; and
    performing the following operations in real-time:
      comparing the session ending time with a last updating time of a sum of visit effect data associated with the website;
      if the session ending time is later than the last updating time,
        calculating visit effect data of the session using the categorized real-time source data of the session, further including generating traffic analysis data, source analysis data, visitor analysis data, and visitor behavior analysis data associated with the website;
        consolidating the visit effect data of the session with the sum of visit effect data associated with the website;
        keeping the categorized real-time source data of the session in the memory to be combined with subsequent real-time source data of the session before the session is completed; and if the session ending time is no later than the last updating time,
calculating completed visit effect data of the session using a completed source data of the session stored in the memory, further including generating a total length of the session, webpage visits information, webpage visiting path and association information, and an exit rate of the session associated with the website;
consolidating the completed visit effect data of the session with the sum of visit effect data associated with the website; and
deleting the completed source data of the session from the memory to refresh the memory;
updating the sum of visit effect data associated with the website.

8. The system for monitoring and analyzing website visit data of claim 7, wherein the one or more programs further include instructions for:
sorting the real-time source data in accordance with an occurrence time of the session.

9. The system for monitoring and analyzing website visit data of claim 7, wherein the one or more programs further include instructions for:
acquiring the user identifier for each session; and
supplementing the user portrait data into the source data of the session.

10. The system for monitoring and analyzing website visit data of claim 7, wherein the one or more programs further include instructions for:
coding a uniform resource locator (URL) in the source data of the session in accordance with a pre-determined compression coding format; and
replacing the URL in the source data of the session with the coded URL.

11. The system for monitoring and analyzing website visit data of claim 7, wherein each dimensional data includes at least page views data and unique visitors data.

12. The system for monitoring and analyzing website visit data of claim 11, further comprising calculating a unique visitors number for each dimensional data, wherein
if an update speed is higher than a pre-defined speed, the unique visitors number is calculated using a set structure, and the user identifier of the session with respect to the dimensional data is stored in a designated memory module; and
if the update speed is lower than the pre-defined speed, the unique visitors number is calculated through determining whether a set structure of unique visitors of a current day includes a user identifier.

13. A non-transitory computer readable storage medium, storing one or more programs for execution by one or more processors of a service processing system including instructions for:
acquiring real-time source data of sessions established between a client terminal and a server, comprising:
scanning the acquired real-time source data of a respective session;
determining whether the scanned source data is a first page of the respective session;
in accordance with a determination that the scanned source data is the first page of the respective session, acquiring user portrait data corresponding to a user identifier associated with the real-time source data of the respective session; and
updating the real-time source data of the respective session using the user portrait data;
classifying the real-time source data into a plurality of categories based on the website and a session identifier;
caching the categorized real-time source data of a session corresponding to the session identifier in the memory, the session having a session ending time; and
performing the following operations in real-time:
comparing the session ending time with a last updating time of a sum of visit effect data associated with the website;
if the session ending time is later than the last updating time,
calculating visit effect data of the session using the categorized real-time source data of the session, further including generating traffic analysis data, source analysis data, visitor analysis data, and visitor behavior analysis data associated with the website;
consolidating the visit effect data of the session with the sum of visit effect data associated with the website;
keeping the categorized real-time source data of the session in the memory to be combined with subsequent real-time source data of the session before the session is completed; and
if the session ending time is no later than the last updating time,
calculating completed visit effect data of the session using a completed source data of the session stored in the memory, further including generating a total length of the session, webpage visits information, webpage visiting path and association information, and an exit rate of the session associated with the website;
consolidating the completed visit effect data of the session with the sum of visit effect data associated with the website; and
deleting the completed source data of the session from the memory to refresh the memory;
updating the sum of visit effect data associated with the website.

14. The non-transitory computer readable storage medium of claim 13, wherein the one or more programs further include instructions for:
sorting the real-time source data of sessions in accordance with an occurrence time of the session.

15. The non-transitory computer readable storage medium of claim 13, wherein the one or more programs further include instructions for:
acquiring the user identifier for each session; and
supplementing the user portrait data into the source data of the session.

16. The non-transitory computer readable storage medium of claim 13, wherein the one or more programs further include instructions for:
coding a uniform resource locator (URL) in the source data of the session in accordance with a pre-determined compression coding format; and
replacing the URL in the source data of the session with the coded URL.

* * * * *